April 7, 1925.
B. M. RICH
SLEIGH RUNNER ATTACHMENT FOR AUTOMOBILES
Filed July 1, 1924
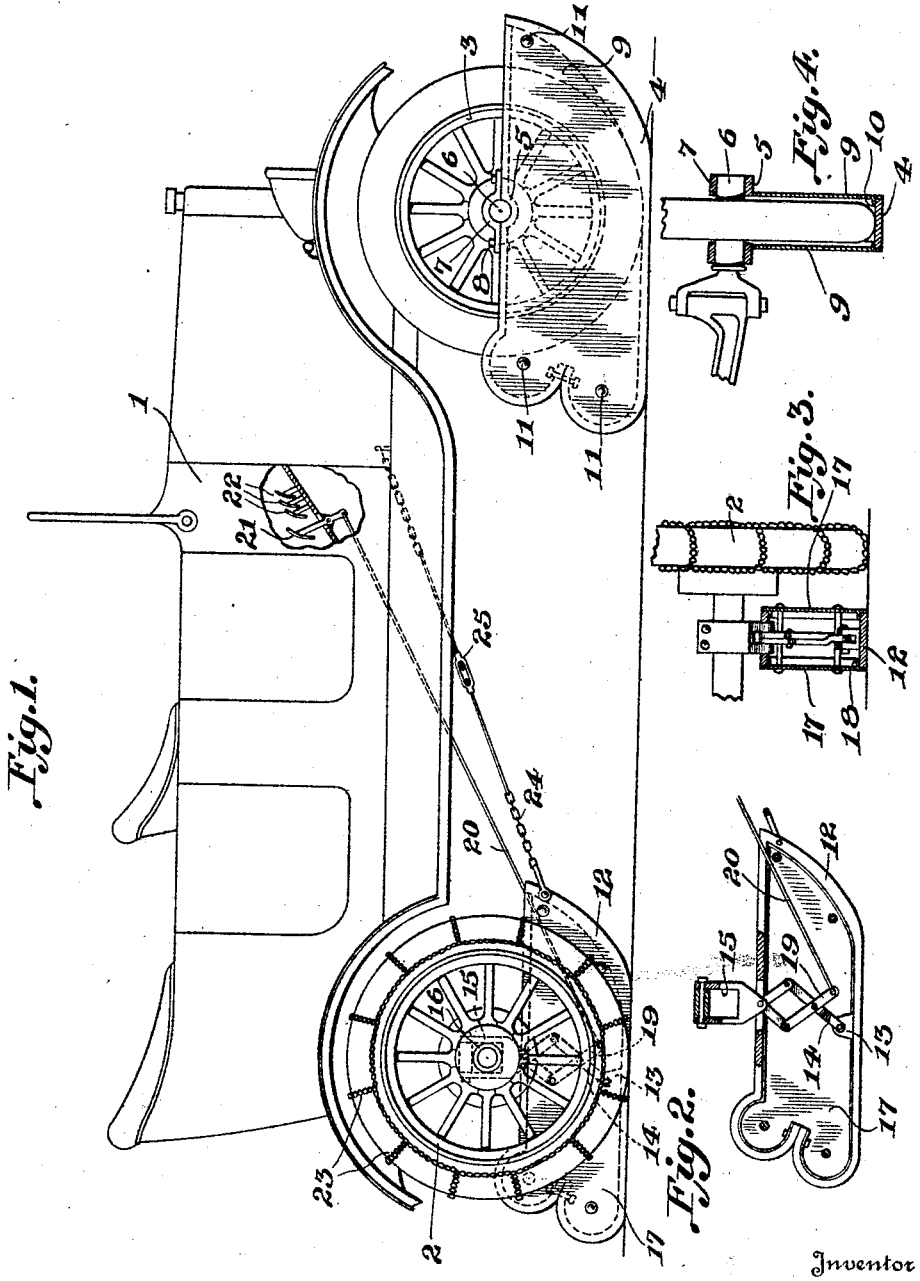
Inventor
Byron M. Rich
By Mason Fenwick & Lawrence,
Attorneys Patented Apr. 7, 1925.

1,532,950

UNITED STATES PATENT OFFICE.

BYRON M. RICH, OF ROME, NEW YORK.

SLEIGH-RUNNER ATTACHMENT FOR AUTOMOBILES.

Application filed July 1, 1924. Serial No. 723,557.

*To all whom it may concern:*

Be it known that I, BYRON M. RICH, citizen of the United States, residing at the city of Rome, in the county of Oneida and State of New York, have invented certain new and useful Improvements in Sleigh-Runner Attachments for Automobiles; and I do hereby declare the following to be a full, clear, and exact description of the invention, such as will enable others skilled in the art to which it appertains to make and use the same.

This invention relates to an improved automobile attachment whereby an automobile may be efficiently operated on snow or ice.

An object of the invention is to provide a sleigh runner attachment for the several wheels of an automobile whereby the same may be quickly placed in position for running on snow or ice, or quickly removed when it is desired to run where there is no snow on the ground.

A further object of the invention is to provide a sleigh runner attachment for automobiles which will materially assist the automobile to travel over snow or ice, the said attachment being so constructed that it may be manually operated to bring sleigh runners into or out of engagement with the snow, and it will utilize power from the rear wheels of the automobile to propel the same.

Other objects will appear as the description proceeds.

In the accompanying drawings which form a part of my application,

Figure 1 is a side view of an automobile equipped with my improved sleigh runners.

Figure 2 is a side elevation of one of the rear sleigh runners with the outer cover plate removed.

Figure 3 is a transverse sectional view through one of the rear sleigh runners showing same attached to the rear axle housing; and Figure 4 is a transverse sectional view through one of the front runners showing the same positioned on a front wheel.

Like characters of reference are used throughout the following specification and the accompanying drawing to designate corresponding parts.

An automobile 1 of any make is provided with the rear wheels 2 and front wheels 3. The front wheels are adapted to be positioned upon the runners 4, which are formed of scrap metal and are provided adjacent the center of their upper portions with the curved bearings 5 which are adapted to receive the hub or axle housings 6 of the front wheels. Curved bearing plates 7 are adapted to be positioned over the upper surfaces of the axle housing 6 and are adapted to be held in position by means of the bolts 8. Side or cover plates 9 are provided with the inwardly extending flanges 10 and are adapted to be positioned at either side of the runners 4 and to extend flush therewith. Suitable bolts 11 are adapted to extend through the spaced cover plates 9 to hold the same in operative position, and to further prevent the snow from entering into the space between the said plates occupied by the front wheels.

The sleigh runners 12 are formed in the same manner as the runners 4, with the exception they are provided with an upwardly extending lug 13 to which is attached a lever 14 of a lazy tong, which is attached at its opposite end to the securing clamp 15 which is adapted to be disposed about the rear axle housing 16 and to be held in place thereon. These rear runners are adapted to be disposed just inside of the rear wheels, as more clearly illustrated in Figure 3 of the drawings. Cover or side plates 17 are provided with the inwardly extending flanges 18 in the same manner as the side plates for the front runners, and are adapted to completely close the opposite sides of the sleigh runners 12 to prevent the space between the said side plates from becoming filled with snow. The lever 19 of the lazy tong is connected to one end of a rod 20, which has its opposite end connected to a foot pedal 21 on the floor board of the automobile adjacent the customary foot pedals 22, so that when the pedal 21 is depressed it will cause the lazy tong to spread until the runners 12 engage with the snow covered ground. When it is desired to elevate the runners the pedal 21 permitted to drop back thereby raising the said runners from the ground.

It will be understood that the rear wheels of the automobile are adapted to light contact with the ground so that when chains 23 are positioned thereon traction will be had to propel the automobile.

Chains 24 are attached to the front of the rear runners 12 and are connected at their opposite ends to the automobile, so that there will be a steady pull on the said runners. The turn buckles 25 are positioned in the chains 24 so that the same may be shortened or lengthened as desired.

From the foregoing description it will be apparent that I have devised a highly efficient sleigh runner attachment for automobiles which may be readily installed or detached at will.

Other objects will appear as the description proceeds.

Having thus described my invention what I claim as new and desire to secure by Letters Patent of the United States is:—

The combination with a support and a sleigh runner, of means for moving said sleigh runner toward and way from said support, said means comprising a pair of links pivoted on a common axis to said support, a pair of levers pivoted to each other intermediate their ends, one pair of adjacent ends of said lever being pivoted to the free ends of the respective links, one of said links pivoted at its other end to the sleigh runner, the remaining end of the other lever being connected to an operating rod whereby as the operating rod is moved, the sleigh runner may be moved bodily with respect to said support.

In testimony whereof I affix my signature.

BYRON M. RICH.